United States Patent
Morris et al.

(10) Patent No.: US 8,046,142 B2
(45) Date of Patent: Oct. 25, 2011

(54) APPARATUS AND METHOD FOR DETERMINING DRIVELINE LASH ESTIMATE

(75) Inventors: Robert L. Morris, Milford, MI (US); R. Anthony Hansen, Redford, MI (US); Michael D. Haggerty, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 563 days.

(21) Appl. No.: 12/264,413

(22) Filed: Nov. 4, 2008

(65) Prior Publication Data

US 2010/0114424 A1    May 6, 2010

(51) Int. Cl.
    *G06F 17/00* (2006.01)
(52) U.S. Cl. ............................................. 701/51; 701/31
(58) Field of Classification Search ............. 701/31, 701/36, 51–56, 58, 69; 180/65.265, 65.285, 180/65.28
    See application file for complete search history.

(56) References Cited

U.S. PATENT DOCUMENTS

| 6,574,535 | B1 | 6/2003 | Morris |
| 6,953,409 | B2 | 10/2005 | Schmidt et al. |
| 7,315,774 | B2 | 1/2008 | Morris |
| 7,823,471 | B2 * | 11/2010 | Tamai et al. ................... 74/89.4 |
| 7,971,667 | B2 * | 7/2011 | Yamazaki ................ 180/65.265 |
| 2007/0225886 | A1 | 9/2007 | Morris |
| 2007/0225887 | A1 | 9/2007 | Morris |
| 2007/0225888 | A1 | 9/2007 | Morris |

* cited by examiner

*Primary Examiner* — Richard M. Camby
(74) *Attorney, Agent, or Firm* — Quinn Law Group, PLLC (57) ABSTRACT

An improved method and apparatus for estimating driveline lash in a vehicle powertrain is provided herein. The method includes: determining if the powertrain is transitioning through driveline lash, e.g., driver commanded torque value changes sign, and then stays between a minimum and maximum commanded torque threshold for a calibrated time; if the powertrain is transitioning through driveline lash, determining when the driveline lash is taken up, e.g., when the transmission output acceleration exceeds a threshold minimum output acceleration, and thereafter changes sign; determining when the estimated lash state changes from neutral to a positive or negative state, which may be inferred from the axle torque estimate behavior; determining the time difference between when the driveline lash is taken up and when the estimated lash state changes from neutral to a positive or negative state; and updating the adaptive lash estimate if the aforementioned time difference is not equal to zero.

17 Claims, 5 Drawing Sheets

APPARATUS AND METHOD FOR DETERMINING DRIVELINE LASH ESTIMATE

TECHNICAL FIELD

The present invention relates generally to hybrid vehicle powertrains, and more specifically to methods for controlling hybrid vehicle powertrains.

BACKGROUND OF THE INVENTION

Most conventional motor vehicles, such as the modern-day automobile, include a powertrain (sometimes referred to as "drivetrain") that is generally comprised of an engine that delivers driving power through a multi-speed power transmission to a final drive system, such as a rear differential, axle, and wheels. Automobiles have traditionally been powered solely by a reciprocating-piston type internal combustion engine (ICE) because of its ready availability and relative cost, weight, and efficiency. Such engines include 4-stroke compression-ignited diesel engines and 4-stroke spark-ignited gasoline engines.

Hybrid vehicles, on the other hand, utilize alternative power sources to propel the vehicle, minimizing reliance on the engine for power, thereby increasing overall fuel economy. A hybrid electric vehicle (HEV), for example, incorporates both electric energy and chemical energy, and converts the same into mechanical power to propel the vehicle and power the vehicle systems. The HEV generally employs one or more electric machines that operate individually or in concert with an internal combustion engine to propel the vehicle. Since hybrid vehicles can derive their power from sources other than the engine, engines in hybrid vehicles can be turned off while the vehicle is propelled by the alternative power source(s).

Series hybrid architectures, sometimes referred to as Range-Extended Electric Vehicles (REEVs), are generally characterized by an internal combustion engine in driving communication with an electric generator. The electric generator, in turn, provides power to one or more electric motors that operate to rotate the final drive members. In other words, there is no direct mechanical connection between the engine and the drive members in a series hybrid powertrain. The lack of a mechanical link between the engine and wheels allows the engine to be run at a constant and efficient rate, even as vehicle speed changes—closer to the theoretical limit of 37%, rather than the normal average of 20%. The electric generator may also operate in a motoring mode to provide a starting function to the internal combustion engine. This system may also allow the electric motor(s) to recover energy from slowing the vehicle and storing it in the battery by regenerative braking.

Parallel hybrid architectures are generally characterized by an internal combustion engine and one or more electric motor/generator assemblies, each of which has a direct mechanical coupling to the power transmission. Most parallel hybrid designs combine a large electrical generator and a motor into one unit, providing tractive power and replacing both the conventional starter motor and the alternator. One such parallel hybrid powertrain architecture comprises a two-mode, compound-split, electro-mechanical transmission which utilizes an input member for receiving power from the I/C engine, and an output member for delivering power from the transmission to the driveshaft. First and second motor/generators operate to rotate the transmission output shaft. The motor/generators are electrically connected to an energy storage device for interchanging electrical power between the storage device and the first and second motor/generators. A control unit is provided for regulating the electrical power interchange between the energy storage device and motor/generators, as well as the electrical power interchange between the first and second motor/generators.

Transitions in operating states of hybrid powertrain systems can produce clunks (i.e., audible noises) and jerks (e.g., physical lurches) as slack, resulting from driveline lash in the gear train, is taken out of the driveline, and driveline components impact one another. "Driveline lash" refers to the play or slack in the rotational position of the driveline components, such as clearance between transmission splines, interleafed gearing teeth, etc. When the engine transitions from exerting a positive torque to exerting a negative torque (or being driven), the gears in the transmission or driveline separate at the zero torque transition point. Then, after passing through the zero torque point, the gears again make contact to transfer torque. Such clearance is generally necessary to accommodate build variation and thermal expansion of powertrain components.

Gear lash, clunks, and jerks have the potential to occur during vehicle operations including: when the operator changes transmission gears, e.g. from neutral/park to drive or reverse; when the operator tips into or out of the throttle; or when the vehicle is operated on an inclined surface. Lash action occurs, for example, as follows: torque-generative devices of the powertrain exert a positive torque onto the transmission input gears to drive the vehicle through the driveline. During a subsequent deceleration, torque input to the powertrain and driveline decreases, and gears in the transmission and driveline separate. After passing through a zero-torque point, the gears reconnect to transfer torque, in the form of motor braking, electrical generation, and others. The reconnection of the gears to transfer torque can result in gear-to-gear impacts, with resulting clunks and jerks, which may be perceptible to the vehicle operator, and can negatively affect powertrain and transmission durability.

SUMMARY OF THE INVENTION

The present invention provides an improved method and apparatus for determining the driveline lash estimate of a vehicle powertrain. One goal of this invention is to learn the exact amount of total lash in the vehicle driveline, which may then be used by other system software, for example, to estimate axle torque and the driveline lash state. In addition, the driveline lash closure rate can be more effectively managed to avoid "clunks" and "jerks" when the driveline torque reverses. Having an accurate estimate of the total amount of driveline lash improves the estimate of the lash state, and allows rate limits on the driveline torque to change at the correct times to avoid harsh lash take ups. Finally, driveline lash can vary significantly as a result of vehicle-to-vehicle build variations, and over time through normal operation. The adaptive algorithm of the present invention can adjust the adaptive lash estimate to each vehicle, and also track changes over time as the driveline wears and make adjustments when necessary.

According to one embodiment of the present invention, a method or algorithm for determining driveline lash in a vehicle powertrain is provided. The method includes: determining if the powertrain is transitioning through driveline lash; if the powertrain is transitioning through driveline lash, then determining when the current driveline lash is taken up by the system; determining when the estimated lash state changes from a neutral state to a positive or a negative state;

and recalculating the total lash estimate when both the driveline lash is taken up and the estimated lash state changes from neutral to a positive or negative state.

In accordance with one aspect of this particular embodiment, the method determines a time difference between when the driveline lash is taken up and when the estimated lash state changes. In this instance, the total lash estimate is calculated in response to the time difference not being equal to zero (i.e., if the two times are different, the total lash estimate is incorrect and needs to be changed). To this regard, calculating the total lash estimate preferably includes calculating a lash angle adapt value, which involves applying an offset and a gain to the time difference. The total lash estimate is then calculated, for example, by adding the lash angle adapt value (which may be a positive or a negative value) to a preset nominal angle.

There are numerous powertrain operations which may generate a transition through driveline lash. One manner of determining if the powertrain is transitioning through driveline lash includes monitoring the driver commanded axle torque, detecting if the driver commanded torque switches from a positive value to a negative value (or vice versa), and determining if the driver commanded torque value is between a minimum driver commanded torque threshold and a maximum driver commanded torque threshold. One indication that the powertrain is transitioning through driveline lash is when the driver commanded torque value switches signs, and thereafter maintains a value within the driver commanded torque threshold range.

There are also various ways to identify when the estimated lash state changes from a neutral state to a positive or negative state. One manner of determining when the estimated lash state changes includes determining when the axle torque estimate changes from a zero value to either a positive or a negative value. For example, the axle torque estimate changing from zero to a positive value indicates that the estimated lash state changes from the neutral state to the positive state. Conversely, the axle torque estimate changing from zero to a negative value indicates that the estimated lash state changes from neutral to the negative state. The neutral state is indicated when there is substantially no torque being transmitted between the drive wheels and the driveline.

As part of another aspect of this embodiment, the method further comprises verifying a predetermined array of "necessary" signals before the system determines if the powertrain is transitioning through driveline lash. One way of verifying the necessary signals includes checking all validity signals and fault active signals mapped to the main signals, and verifying that all monitored fault active signals are FALSE and all validity signals are VALID.

According to yet another aspect, one technique for determining when the current driveline lash is taken up includes determining if the transmission output acceleration exceeds a minimum output acceleration threshold, and if the transmission output acceleration switches from a positive value to a negative value, or vice versa. The detected change in direction in the output acceleration indicates when the vehicle has finished crossing to the other side of lash.

In yet another aspect of this embodiment, the method also includes determining if the sign change in transmission output acceleration can be validated against the direction change in estimated lash state. The switch in transmission output acceleration is validated against the change in estimated lash state, for example, when either the transmission output acceleration switches to a negative value contemporaneously with the estimated lash state changing to a positive state, or the transmission output acceleration switches to a positive value contemporaneously with the estimated lash state changing to a negative state. Conversely, the switch in transmission output acceleration is not validated against the change in estimated lash state if both the transmission output acceleration does not switch signs and the estimated lash state does not change states within a predetermined period of time.

According to another embodiment of the present invention, a method is provided for estimating driveline lash in a hybrid vehicle powertrain. The hybrid powertrain has one or more torque generative devices, such as an engine and a pair of motor/generator assemblies, that are operatively connected to a power transmission.

In this embodiment, the method includes: monitoring the driver commanded torque sent to the vehicle powertrain; determining if the driver commanded torque switches from a positive to a negative value, or vice versa; if the driver commanded torque value does switch sign, determining if the driver commanded torque is greater than a minimum driver commanded torque threshold and less than a maximum driver commanded torque threshold for a calibrated period of time; determining if the transmission output acceleration exceeds a minimum output acceleration threshold; if it does, determining when the transmission output acceleration thereafter switches from one of a positive value to a negative value, or vice versa; determining when the estimated lash state changes from a neutral state to a positive or a negative state; determining if there is a time difference between when the transmission output acceleration value switches sign, and when the estimated lash state changes; and, updating the adaptive lash estimate if there is a time difference (i.e., the time difference is not equal to zero).

In accordance with another embodiment of the present invention, a control apparatus for estimating driveline lash in a vehicle powertrain is provided. The powertrain includes at least one torque generative device that is selectively drivingly connectable to a power transmission. The control apparatus includes a controller having a storage medium with programmable memory. The controller is operatively connected to the powertrain, and configured to control operation of the same.

The controller is programmed and configured to determine if the powertrain is transitioning through driveline lash, and respond to a transition through lash by determining when the driveline lash is taken up and when the estimated lash state changes from neutral to a positive or negative state. The controller is also programmed and configured to determine if there is a time difference between when the current driveline lash is taken up and when the estimated lash state changes from a neutral state to a positive or negative state. If there is a time difference, the controller updates the adaptive lash estimate to more accurately reflect the actual amount of total lash in the driveline.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENT

Figure 1:
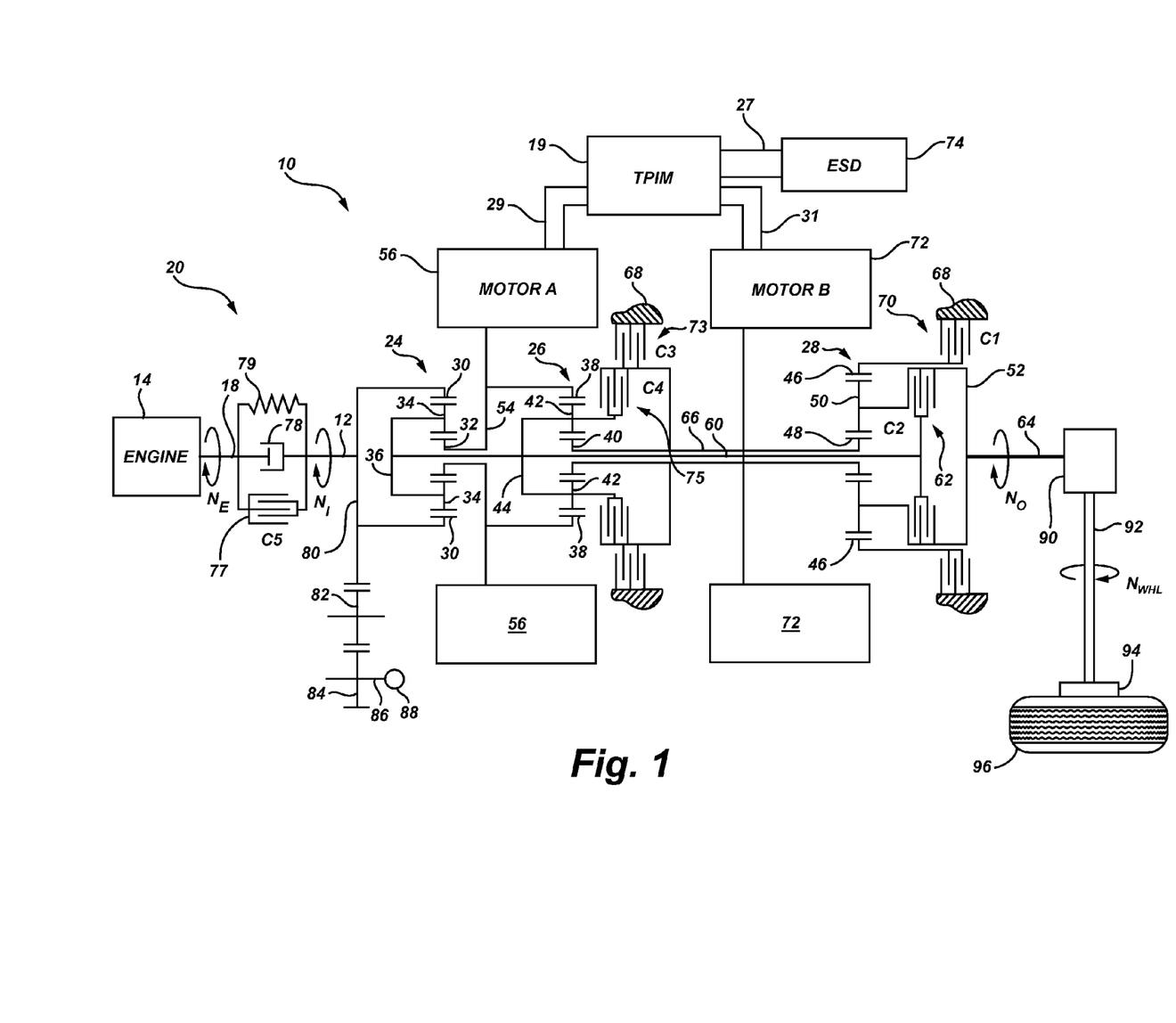
FIG. 1 is a schematic illustration of an exemplary vehicle powertrain for integration and use of the present invention.

Referring to the drawings, wherein like reference numbers refer to like components throughout the several views, FIG. 1 is a schematic representation of an exemplary vehicle powertrain with which the present invention may be utilized. The present invention is described herein in the context of a hybrid-type vehicle having a two-mode, compound-split, power transmission, intended solely to offer a representative application by which the present invention may be incorporated and practiced. Accordingly, the present invention is in no way limited to the particular powertrain configuration illustrated in FIG. 1. By way of example, the present invention is applicable to any electric-hybrid vehicle, both series and parallel, full electric vehicles (EV), and any other motorized vehicle powertrain which may benefit from the present invention. Finally, the hybrid vehicle shown in FIG. 1 has been greatly simplified, it being understood that further information regarding the standard operation of a hybrid powertrain, or a hybrid-type vehicle for that matter, may be found in the prior art.

Turning first to FIG. 1, the two-mode, compound-split, power transmission 10 has an input member 12, which may be in the nature of a shaft, for receiving power from a restartable engine 14. The engine 14 transfers power, preferably by way of torque, to the transmission 10 through an engine output member or crankshaft 18. A transient torque damper 20 is interposed between the crankshaft 18 of the engine 14 and the input shaft 12 of the hybrid transmission 10. The exemplary transient torque damper 20 of FIG. 1 comprises a torque transfer device 77 having characteristics of a damping mechanism and a spring, represented respectively at 78 and 79. The transient torque damper 20 permits selective engagement of the engine 14 with the hybrid transmission 10. The torque transfer device 77 preferably comprises a hydraulically operated torque transfer device, which is also referred to herein as friction clutch C5.

In the embodiment depicted in FIG. 1, the engine 14 may be any of numerous forms of reciprocating-piston type internal combustion engines, such as a spark-ignited gasoline engine or a compression-ignited diesel engine, readily adaptable to provide its available power to the transmission 10 at a range of operating speeds, for example, from idle, at or near 600 revolutions per minute (RPM), to over 6,000 RPM. Irrespective of the means by which the engine 14 is connected to the input shaft 12 of the transmission 10, the input shaft 12 is connected to a planetary gear set 24 in the transmission 10.

The transmission 10 is adapted to manipulate and distribute power from the engine 14 to a final drive system, as will be explained in extensive detail hereinbelow. Referring again to FIG. 1, the hybrid transmission 10 utilizes one or more epicyclic gear arrangements, preferably in the nature of three interconnected planetary-gear sets 24, 26 and 28, respectively. The first planetary gear set 24 has an outer gear member 30, typically designated as the "ring gear", which circumscribes an inner gear member 32, which may be generally designated as a "sun gear". A plurality of planetary gear members 34 (also referred to in the art as "pinion gears") are rotatably mounted on a carrier member 36; each planetary gear member 34 is meshingly engaged with both the ring gear member 30 and the sun gear member 32.

The second planetary gear set 26 also has an outer "ring" gear member 38, which circumscribes an inner "sun" gear member 40. The ring gear member 38 is coaxially aligned and rotatable with respect to the sun gear member 40. A plurality of planetary gear members 42 are rotatably mounted on a carrier member 44 such that each planetary gear 42 meshingly engages both the ring gear member 38 and the sun gear member 40.

The third planetary gear set 28, similar to the first and second gear sets 24, 26, also has an outer "ring" gear member 46, which circumscribes an inner "sun" gear member 48. The ring gear member 46 is coaxially aligned and rotatable with respect to the sun gear member 48. A plurality of planetary or pinion gear members 50 are rotatably mounted on a carrier member 52; each planetary gear 50 meshingly engages both the ring gear member 46 and the sun gear member 48.

The three planetary gear sets 24, 26 and 28 each comprise simple planetary gear sets. However, each of the carrier members described above can be either a single-pinion (simple) carrier assembly or a double-pinion (or compound) carrier assembly. Furthermore, the first and second planetary gear sets 24, 26 are compounded in that the sun gear member 32 of the first planetary gear set 24 is conjoined, as through a hub plate gear 54, to the ring gear member 38 of the second planetary gear set 26. The conjoined sun gear member 32 of the first planetary gear set 24 and the ring gear member 38 of the second planetary gear set 26 are continuously connected to a first motor/generator 56, also referred to as "Motor A".

The first and second planetary gear sets 24, 26 are further compounded in that the carrier member 36 of the first planetary gear set 24 is conjoined, as through an intermediate shaft 60, to the carrier member 44 of the second planetary gear set 26. As such, carrier members 36, 44 of the first and second planetary gear sets 24, 26, respectively, are rigidly attached for common rotation. The intermediate shaft 60 is also selectively connectable to the carrier member 52 of the third planetary gear set 28, as through a second torque transfer device 62 (C2). As will be hereinafter more fully explained, the torque transfer device 62 is employed to assist in the selection of the operational modes of the hybrid transmission 10. The carrier member 52 of the third planetary gear set 28 is connected directly to the transmission output member 64, which is preferably in the nature of a shaft.

In the exemplary embodiment described herein, wherein the hybrid transmission 10 is used as a land vehicle, the transmission output shaft 64 is operatively connected to a final drive system, also referred to herein as "driveline", which is represented herein by a differential 90 or other torque transfer device which provides torque output to one or more vehicular axles 92 or half-shafts (not shown). The axles 92, in turn, deliver torque to drive members, represented herein as vehicle wheel(s) 96. The wheels 96 may be either front or rear wheels of the vehicle on which they are employed, or they may be a drive gear of a track vehicle. The wheels 96 may have some form of wheel brake, represented schematically at 94, associated therewith. The wheels 96 each have a speed parameter, $N_{WHL}$, comprising rotational speed of each wheel 96, which is typically measurable with a wheel speed sensor. Although not specifically illustrated in FIG. 1, it should be appreciated that the final drive system may comprise any known configuration—e.g., front wheel drive (FWD), rear wheel drive (RWD), four-wheel drive (4 WD), or all-wheel drive (AWD), within the scope of the present invention.

The sun gear member 40 of the second planetary gear set 26 is continuously connected to the sun gear member 48 of the third planetary gear set 28, as through a sleeve shaft 66 that circumscribes intermediate shaft 60. The ring gear member 46 of the third planetary gear set 28 is selectively connected to a stationary member, represented in FIG. 1 by transmission housing 68, through a torque transfer device 70 (also identified as clutch "C1"). Torque transfer device 70, as is hereinafter explained, is also employed to assist in the selection of the operational modes of the hybrid transmission 10. The sleeve shaft 66 is also continuously connected to a second motor/generator 72, also referred to as "Motor B".

All of the planetary gear sets 24, 26, 28, as well as the first and second motor/generators 56, 72, are coaxially oriented, as about the axially disposed intermediate transmission shaft 60. Motor/generators 56, 72 are both of an annular configuration which permits them to circumscribe the three planetary gear sets 24, 26, 28. For instance, the planetary gear sets 24, 26, 28 are shown nested inside—i.e., disposed generally radially inwardly of, the first and second motor/generators 56, 72. This configuration assures that the overall envelope, i.e., the circumferential and longitudinal dimensions, of the hybrid transmission 10 are minimized.

A torque transfer device 73 (or clutch "C3") selectively connects the sun gear 40 with the transmission housing 68. A torque transfer device 75 (or clutch "C4") is operative as a lock-up clutch, locking planetary gear sets 24, 26, motor/generators 56, 72, and the shafts 60 and 66 to rotate as a group, by selectively connecting the sun gear 40 with the carrier member 44. In the exemplary embodiment of FIG. 1, the torque transfer devices 62, 70, 73, 75 are all friction clutches. Each clutch is preferably hydraulically actuated, receiving pressurized hydraulic fluid from a pump (not shown). Hydraulic actuation is accomplished using a conventional hydraulic fluid circuit, which is not described in detail herein.

The hybrid transmission 10 receives input motive torque from a plurality of "torque-generative devices", which include the engine 14 and motors/generators 56, 72, as a result of energy conversion from fuel stored in a fuel tank or electrical potential stored in an electrical energy storage device (ESD) 74. That is, the engine 14 and motor/generators A, B operate, individually or in concert, in conjunction with the planetary gear sets and selectively engageable torque transmitting mechanisms highlighted above, to rotate the transmission output shaft 64. The motor/generator assemblies A, B are preferably configured to selectively operate as both a motor and a generator. That is, the motor/generator assemblies A, B are capable of converting electrical energy to mechanical energy (e.g., during vehicle propulsion), and converting mechanical energy to electrical energy (e.g., during regenerative braking).

The ESD 74 typically comprises a hybrid battery pack, including an array of battery modules. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist, and electric range. The ESD 74 is high voltage DC-coupled to transmission power inverter module (TPIM) 19 via DC lines or transfer conductors 27. The TPIM 19 communicates with the first motor/generator 56 by first transfer conductors 29, and the second motor/generator 72 by second transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29, 31. In regeneration control, the respective inverter receives AC current from the motor over transfer conductors 29, 31 and provides current to the DC lines 27. The net DC current provided to or from the inverters determines the charge or discharge operating mode of the ESD 74. Ideally, Motor A 56 and Motor B 72 are three-phase AC machines, and the inverters comprise complementary three-phase power electronics.

Referring again to FIG. 1, a drive gear 80 may be presented from the input shaft 12. As depicted, the drive gear 80 continuously connects the input shaft 12 to the ring gear member 30 of the first planetary gear set 24. The drive gear 80 receives power from the engine 14, the first motor/generator 56, the second motor/generator 72, or any combination thereof. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and effectively comprise an accessory load.

Figure 2:
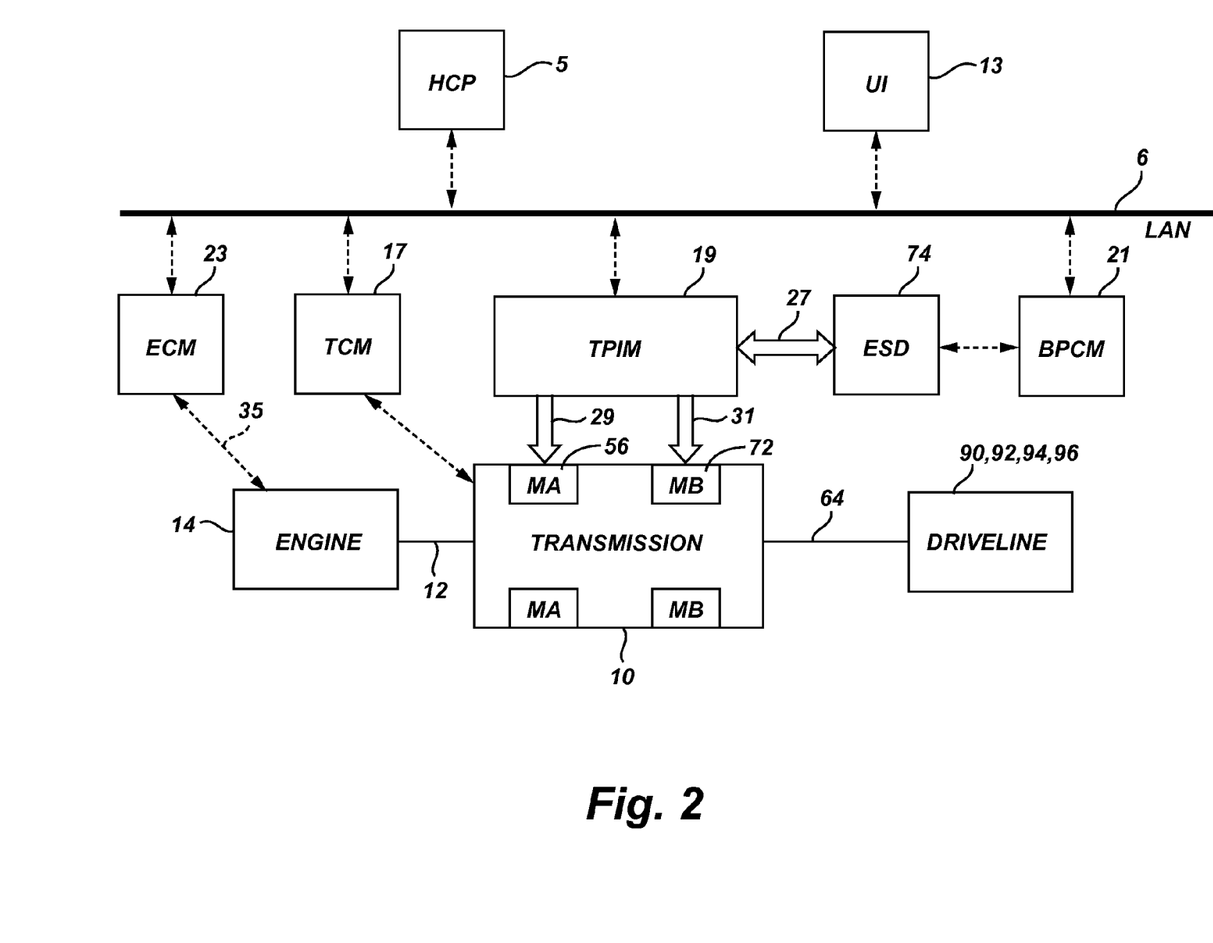
FIG. 2 is a schematic diagram of an exemplary control apparatus in accordance with a preferred embodiment of the present invention.

Turning to FIG. 2, a schematic block diagram of a control apparatus, comprising a distributed controller architecture, is shown. The control apparatus of FIG. 2 is operable, as described hereinafter, to provide coordinated system control of the powertrain system depicted and described herein. The constituent elements of the control apparatus comprise a subset of an overall vehicle control system. The control system is operable to synthesize pertinent information and inputs, and execute control methods and algorithms, such as the method illustrated in FIG. 5, to control various actuators to achieve control targets, including such parameters as fuel economy, emissions, performance, driveability, and protection of drivetrain hardware, such as, but certainly not limited to, transmission 10, first and second motor/generators 56, 72, and ESD 74.

The distributed controller architecture includes Transmission Control Module (TCM) 17, Transmission Power Inverter Module (TPIM) 19, Battery Pack Control Module (BPCM) 21, and Engine Control Module (ECM) 23. A hybrid control module (HCP) 5 provides overall control and coordination of the aforementioned controllers. A User Interface (UI) 13 is operatively connected to a plurality of devices (not individually shown) through which a vehicle operator typically controls or directs operation of the powertrain, including the transmission 10. Exemplary vehicle operator inputs to the UI 13 include an accelerator pedal, a brake pedal, transmission gear selector, and vehicle speed cruise control. Each of the aforementioned controllers communicates with other controllers, sensors, actuators, etc. via a local area network (LAN) bus 6. The LAN bus 6 allows for structured communication of control parameters and commands between the various controllers. The specific communication protocol utilized is application-specific. By way of example, and certainly not limitation, one communications protocol is the Society of Automotive Engineers standard J1939. The LAN bus 6 and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the TCM 17, TPIM 19, BPCM 21, and ECM 23. Based upon various input signals from the UI 13 and the powertrain, the HCP 5 generates various commands, including, but not limited to, an engine torque command, clutch torque commands, e.g., for the various clutches C1-C4 of the hybrid transmission 10, and motor torque commands, for the Motors A and B.

The ECM 23 is operatively connected to the engine 14. The ECM 23 is configured to acquire data from a variety of sensors and control a variety of actuators, respectively, of the engine 14 over a plurality of discrete lines, shown in aggregate as line 35. The ECM 23 receives an engine torque command from the HCP 5, and generates a desired axle torque, and an indication of actual engine torque, which is communicated to the HCP 5. For simplicity, ECM 23 is shown generally having bidirectional interface with engine 14 via aggregate line 35. Various other parameters that may be sensed by ECM 23 include engine coolant temperature, engine input speed to the transmission, manifold pressure, and ambient air temperature and pressure. Various actuators that may be controlled by the ECM 23 include, for example, fuel injectors, ignition modules, and throttle control modules.

The TCM 17 is operatively connected to the transmission 10, and functions to acquire data from a variety of sensors and provide command signals to the transmission 10. Inputs from the TCM 17 to the HCP 5 include estimated clutch torques for each of the clutches C1-C4, and rotational speed of the transmission output shaft 64. Additional actuators and sensors may be used to provide additional information from the TCM to the HCP for control purposes.

The BPCM 21 is in signaling communication with a plurality of sensors (not explicitly shown) that are operable to monitor electrical current or voltage parameters of the ESD 74 to provide information about the state and health of the batteries to the HCP 5. Such information includes battery state-of-charge, temperature, and other states of the batteries, including voltage and available power.

With continuing reference to FIG. 2, the TPIM 19 includes a pair of power inverters and motor controllers configured to receive motor control commands and control inverter states therefrom to provide motor drive or regeneration functionality. The TPIM 19 is operable to generate torque commands for Motors A and B, based, at least in part, upon input from the HCP 5, which is driven by operator input through UI 13 and system operating parameters. The predetermined torque commands for Motors A and B are adjusted with motor damping torques to determine motor torques, which are implemented by the control system, including the TPIM 19, to control the motors A and B. Individual motor speed signals for Motor A and Motor B are derived by the TPIM 19 from the motor phase information or conventional rotation sensors. The TPIM 19, in turn, determines and communicates motor speeds to the HCP 5. The electrical energy storage device 74 is high-voltage DC-coupled to the TPIM 19 via DC lines 27. Electrical current is transferable to/from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are preferably executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals—e.g., each 3, 6.25, 15, 25 and 100 milliseconds, during vehicle operation.

In response to operator input, as captured by the UI 13, the supervisory HCP controller 5 and one or more of the other controllers shown in FIG. 2 determine required transmission output torque. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other variables, including such factors as road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

Operation of the hybrid vehicle shown in FIG. 1 may be adversely affected by torque oscillations that occur when abrupt torque changes are encountered in the operation of transmission 10, engine 14, and motor/generators 56, 72. Such oscillations are encountered, for example, during launching, shifting, and mode changes. The damping of such torque oscillations will enhance vehicle drivability and performance, increase operational life expectancy of the powertrain, and improve operator satisfaction. Coordinated control of the torque-generative devices—i.e., engine 14 and motor/generators 56, 72, may be used to provide such damping.

Multivariate active driveline damping comprises basic elements for controlling torque outputs from the torque-generative devices 14, 56, 72 through the transmission 10 to the driveline. This includes the overall control elements of determining reference parameters for a plurality of operating states, based upon current operating conditions and desired operating conditions, through a desired dynamics control scheme. The motor damping torque control scheme is operable to determine motor damping torques for controlling the torque-generative devices, i.e. Motor A and Motor B, based upon the aforementioned reference parameters, and a plurality of operating state errors that comprise feedback from the powertrain and driveline, each which have determinable dynamic properties Outputs of the desired dynamics segment comprise a plurality of reference values for axle torque, damper torque, and various speeds. The reference values and the plurality of operating state errors calculated from outputs of the driveline comprise inputs to a motor damping torque control scheme. The motor damping torque control scheme is executed to determine damping torques to the torque-generative devices, in this embodiment to Motors A and B. Driveline dynamic control, shown schematically in FIG. 3 at 140, comprises controlling inputs to each torque-generative device and other torque devices in the transmission and driveline, based upon the operating state errors and the reference states.

In overall operation, the driveline dynamics estimator 110 (FIG. 3) is a mathematical model comprising a plurality of linear equations executed as algorithms within one of the controllers. The mathematical model equations, including calibration values, are executed using algorithms to model representations of operation of the exemplary powertrain described with reference to FIGS. 1 and 2, taking into account application-specific masses, inertias, friction factors, and other characteristics and parameters of the driveline that affect various operating states. Estimating state parameters for the aforementioned powertrain system includes monitoring operating rotational speed for each of the torque-generative devices, in this case Motors A and B, and engine 14. The engine output speed, $N_E$, is measured at crankshaft 18, transmission input, $N_I$, is measured at transmission input shaft 12, whereas the output rotational speed, $N_O$, of the transmission 10 is measured at output shaft 64. Torque commands from the control system to the torque-generative devices are determined, and referred to as $T_A$, $T_B$, and $T_E$. Additionally, a plurality of driveline torque loads are also determined and used as input(s).

The abovementioned mathematical model equations are executed in one of the controllers to estimate each state parameter, including damper torque, desired axle torque, the individual motor speed signals, rotational speed of the output shaft, engine input speed, and wheel speed, using as inputs, for example, the operating speed for each of the torque-generative devices, the output speed of the transmission device, the torque commands to the torque-generative devices, and the torque loads. The distributed controller architecture shown in FIG. 2, and the algorithmic structure described herein is executed in a manner that causes estimation of the aforementioned state parameters to be achieved in real-time. To be more precise, calculation of each estimated state occurs during a single loop of the controller so there is limited or no lag time in determining the various states, thus eliminating or minimizing potential for loss of control of the system. Input parameters to the driveline dynamics estimator 110 include, for example, motor torque values, $T_A$ and $T_B$, engine torque, $T_E$, clutch torques, $T_{CL-N}$, to clutches C1, C2, C3, C4, brake torque, $T_{BRAKE}$, accessory load, $T_{ACC}$, road load, $T_{RL}$, and the transmission operating mode.

The mathematical model equations are applied to the aforementioned inputs to dynamically calculate estimated output state parameters of the driveline, including estimated damper torque, $T_{DAMP-EST}$, estimated axle torque, $T_{AXLE-EST}$, estimated motor speeds, $N_{A-EST}$ and $N_{B-EST}$, estimated output speed, $N_{O-EST}$, estimated engine input speed, $N_{E-EST}$, and estimated wheel speed, $N_{WHL-EST}$, based upon the input parameters indicated above. A first speed matrix comprising the estimated speeds $N_{A-EST}$, $N_{B-EST}$, $N_{O-EST}$, $N_{E-EST}$, $N_{WHL-EST}$, is subtracted from a second speed matrix comprising measured speeds, $N_A$, $N_B$, $N_O$, $N_E$, $N_{WHL}$, output from driveline dynamic control 140. The resultant matrix is input to an estimator 130 (FIG. 3), where it is multiplied by one of a plurality of gain matrices to determine a matrix of estimated state corrections. Each of the gain matrices comprises a matrix of scalar gain factors, preferably determined for each transmission operating mode—i.e. the specific operating mode and gear configuration. In preferred practice, the gain matrices are determined off-line, and stored as calibration values in one of the on-board controllers. There are preferably at least two sets of gain matrices developed and executed as part of the estimator feedback gain 130 action, wherein one set is for use when the driveline is in a neutral lash state, and one set is for use when the driveline is in a drive state.

Figure 3:
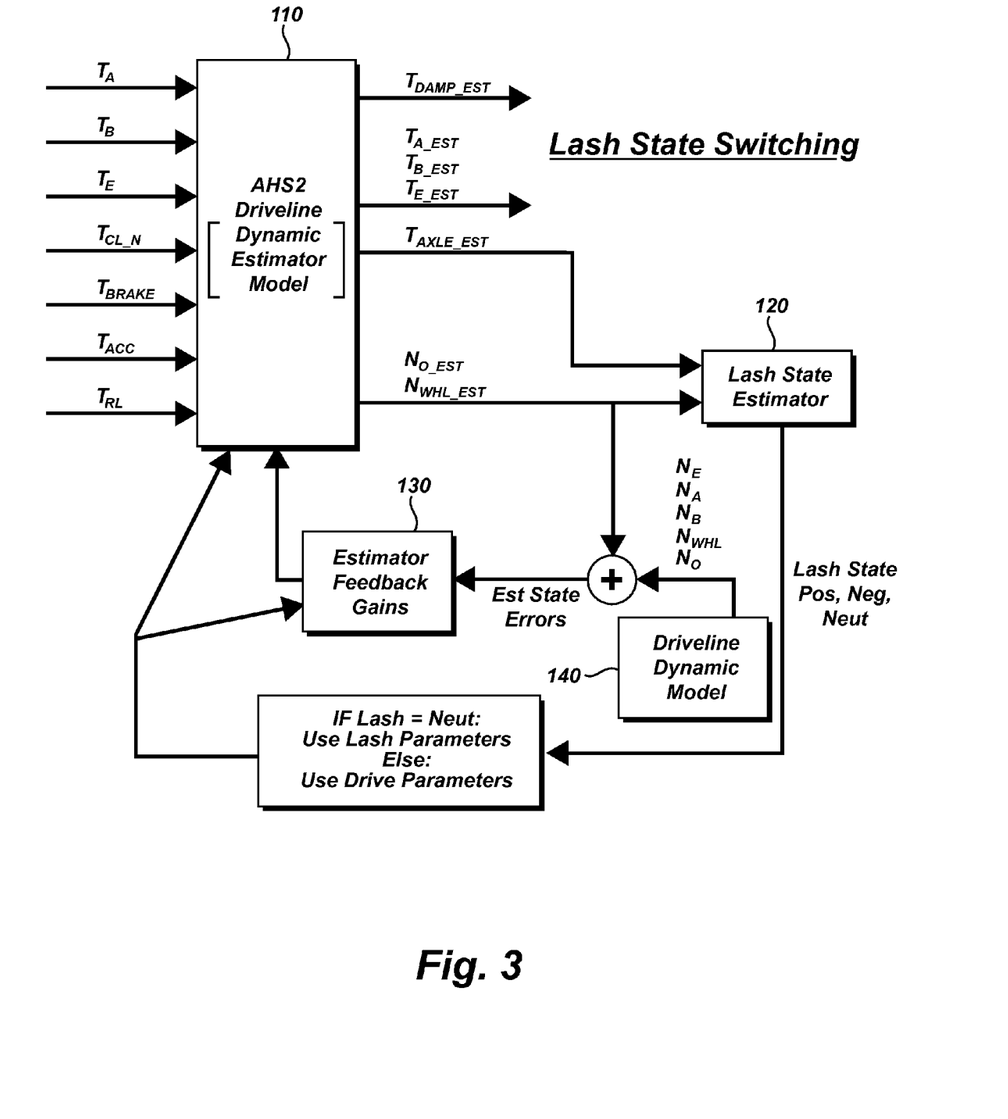
FIG. 3 is a schematic information flow diagram illustrating an exemplary method for controlling torque transmitted from a powertrain system during transitions resulting in driveline lash and clunks.

The matrix of estimated state corrections is used as feedback by the driveline dynamics estimator 110 in determining the dynamically calculated estimated output states of the driveline, including $T_{DAMP-EST}$, $T_{AXLE-EST}$, $N_{A-EST}$, $N_{B-EST}$, $N_{O-EST}$, $N_{E-EST}$, $N_{WHL-EST}$, based upon the input parameters. When the first speed matrix comprising the estimated speeds is equal to the second speed matrix comprising the measured speeds, it is determined that the outputs of the estimator are accurate measurements of actual operating states of the driveline.

As indicated above, hybrid powertrain systems, such as the exemplary two-mode, compound-split, electro-mechanical transmission described with respect to FIG. 1, have multiple torque-generative devices (e.g., engine 14 and Motors A and B). Coordinated control of the torque-generative devices can reduce driveline gear lash, clunks, and jerks. Additionally, managing driveline transitions, such as when one of the motor/generators transitions from operating in a motoring mode to operating in a generating mode (e.g., during regenerative braking), can further ameliorate the effects of driveline lash.

An exemplary technique for controlling torque transmitted from a powertrain system, such as that described with reference to FIGS. 1 and 2, during transitions resulting in driveline lash and clunks is represented schematically in FIG. 3. The methodology and system described with respect to FIG. 3 is executed as one or more algorithms in the distributed controller architecture shown with reference to FIG. 2, and utilizes the multivariate feedback control scheme, including parameter state estimation, described hereinabove. The overall method comprises monitoring the magnitude of powertrain torque transmitted to the driveline, $T_{AXLE}$, output speed of the transmission to the driveline, $N_O$, and driven wheel speed, $N_{WHL}$. A lash state is determined, and each of the torque-generative devices of the powertrain is controlled based upon the lash state.

In the embodiment of FIG. 3, the lash state is determined using the estimator 120, which preferably comprises an algorithm within the control system. Inputs to the lash state estimator 120 include, for example, estimated axle torque, $T_{AXLE-EST}$, estimated output speed of the transmission, $N_{O-EST}$, and estimated driven wheel speed, $N_{WHL-EST}$, each of which is output from the driveline dynamics estimator 110. The lash state estimator 120 is operable to compare the estimated axle torque, $T_{AXLE-EST}$, and estimated output speed, $N_{O-EST}$, to determine the lash state to be one of a positive state, a negative state, or a neutral state. The positive state is indicated when the estimated axle torque, $T_{AXLE-EST}$, estimated output speed, $N_{O-EST}$, and estimated driven wheel speed, $N_{WHL-EST}$, show torque being transmitted from the transmission 10 through the driveline in a forward direction. The negative state is indicated when the estimated axle torque, $T_{AXLE-EST}$, estimated output speed, $N_{O-EST}$, and estimated driven wheel speed, $N_{WHL-EST}$, show torque being transmitted from the transmission 10 through the driveline in a negative (or reverse) direction. The neutral state is indicated when there is substantially no torque being transmitted between the drive wheels and the driveline through the transmission 10 (i.e. the driveline axle torque value is substantially equal to a zero).

When output of the lash state estimator 120 indicates a positive lash state or a negative lash state, in general, no action occurs in the control system based upon the lash. When output of the lash state estimator 120 indicates a neutral state, however, the resultant matrix comprising the aforementioned difference between the first speed matrix comprising estimated speeds and the second speed matrix comprising measured speeds is multiplied by the gain matrix in the estimator feedback gain 130 for use when the driveline is in the neutral lash state.

When the matrix of estimated state corrections for lash operation is used in the driveline dynamics estimator 110, the resultant outputs of the estimator 110, including $T_{DAMP-EST}$, $T_{AXLE-EST}$, $N_{A-EST}$, $N_{B-EST}$, $N_{O-EST}$, $N_{E-EST}$, and $N_{WHL-EST}$, are provided as feedback for use with the multivariate motor damping control. The multivariate motor damping control uses the estimator outputs to dampen actual axle torque output, $T_{AXLE}$, during the period of time in which the neutral lash state is detected. Damping of axle torque output, $T_{AXLE}$, is preferably accomplished by controlling a time-rate transfer of electrical energy between one of the electrical motors 56, 72 and the electrical energy storage device 74 by moderating flow of electrical current through the power inverters and motor controllers of TPIM 19, i.e. controlling the time-rate transfer of electrical energy.

Alternatively, damping of axle torque output, $T_{AXLE}$, may be accomplished by moderating torque input to the transmission 10 from the internal combustion engine 14 through the crankshaft 18 and transmission input shaft 12, using pre-specified engine control strategies. Thus, the torque transmitted to the driveline, $T_{AXLE}$, is less than operator-commanded torque, $T_{AXLE-DES}$, when the lash state is neutral. When the lash state subsequently becomes either positive or negative, use of the lash gain matrices is discontinued, and a gain matrix is selected.

When estimated axle torque, $T_{AXLE-EST}$, is determined to be substantially equal to zero, the lash state changes from a positive lash to neutral lash. The controller is able to determine when the lash event ends, e.g., when the neutral lash state ends, based, for example, upon the estimated wheel speed, $N_{WHL-EST}$, multiplied by a final drive ratio of the transmission and driveline, estimated output speed, $N_{O-EST}$, and the estimated lash angle, from which a lash closure rate is determinable. Ideally, an estimated closure angle will also be determined concurrently therewith. The controller can control torque outputs from Motor A and Motor B, based upon this closure rate. Controlling torque outputs from the electric motors is typically accomplished by controlling the rate and magnitude of electrical energy transferred from the ESD 74 to one or both electric motors 56, 72.

The lash control scheme exemplified in FIG. 3 can also be used to manage clunk—i.e. driveline noise. For example, desired axle torque, $T_{AXLE-DES}$, is determined, and adjusted to reach a clunk-limited desired axle torque, which is implemented during a neutral lash event. The lash closure rate can be limited to a maximum value; an exemplary value falling in the area of four radians per second. This action provides that a rate of change in the actual axle torque will be less than the desired rate of change, thus limiting clunk or noise. The torque limitation is preferably accomplished by controlling damping torque values for Motors A and B, $T_{A-DAMP}$ and $T_{B-DAMP}$, calculated with reference to the multivariate motor damping torque control. The multivariate motor damping control uses the estimator outputs to dampen actual axle torque output, $T_{AXLE}$. Thus, the torque transmitted to the driveline, $T_{AXLE}$, is less than operator-commanded torque, $T_{AXLE-DES}$, when the desired axle torque is clunk-limited.

Each of the plurality of lash gain matrices used in estimator feedback gain block 130 comprises a matrix of scalar gain factors, preferably determined for each transmission operating mode—i.e., the specific operating mode and gear configuration. In this embodiment the lash gain factors are determined off-line, and stored as calibration values in one of the on-board controllers. Furthermore, duration of use of the lash gain factor may be limited to a predetermined elapsed time. In this manner, the multivariate feedback control scheme is useable to manage and suppress magnitude and occurrence of driveline clunks.

Figure 5:
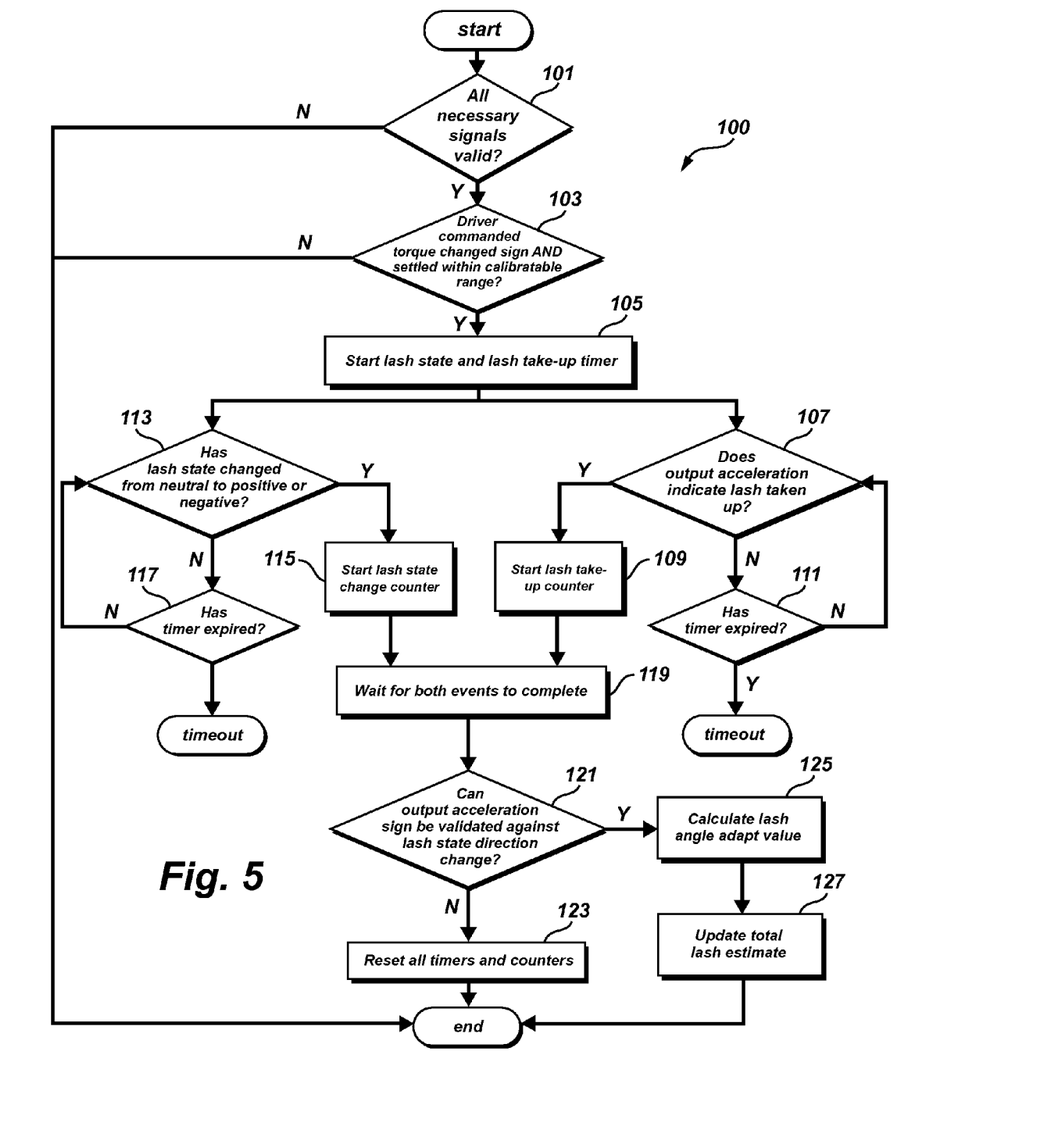
FIG. 5 is a flow chart or block diagram illustrating a control algorithm or method for determining the driveline lash estimate in accordance with a preferred embodiment of the present invention.

With reference now to the flow chart shown in FIG. 5, an algorithm for determining the driveline lash estimate, namely an improved method for estimating and systematically adjusting or recalculating an adaptive lash estimate, is shown generally at 100 in accordance with a preferred embodiment of the present invention. The method or algorithm 100 is described herein with respect to the structure illustrated in FIG. 1, preferably executed as an algorithm in the controllers of the control system described hereinabove with reference to FIG. 2, to control operation of the system described with reference to FIG. 1. However, the present invention may also be incorporated into other vehicle configurations, and applied to other powertrain arrangements. In addition, the method 100 preferably includes at least steps 101-127. However, it is within the scope and spirit of the present invention to omit steps, include additional steps, and/or modify the order presented in FIG. 3. It should be further noted that the method 100 represents a single operation or sequence. However, it is expected, as indicated above, that the method 100 be applied in a systematic and repetitive manner. Finally, the use of such terminology as "sensing", "detecting", "measuring", "calculating", or otherwise "determining" is not intended as limiting, and should be considered relatively interchangeable.

Looking to FIG. 5, specifically step 101 of the method 100, the HCP 5 will first ascertain if all "necessary" signals needed to complete or accomplish the end objective of method 100 are valid before proceeding to any subsequent steps. One manner of determining if the signals are valid includes checking all validity signals, fault active signals, or both, that are mapped to the main signals being used by the algorithm 100. A "fault active signal" that returns as "TRUE" indicates that a fault was detected in the hardware, and thus the hardware signal value that it is associated therewith cannot be trusted. For example, a speed sensor reading out of range would set a "fault active" signal. A "validity signal" is set to "INVALID" if the data used to calculate its associated signal is corrupted—e.g., a faulted sensor or a corrupted CAN message was used in calculating a signal. The HCP 5 therefore preemptively verifies that all monitored fault active signals are FALSE and/or all validity signals are VALID.

Once all necessary signals are validated, the control apparatus (FIG. 2) will then monitor the powertrain to determine if the driveline is transitioning through driveline lash. There are numerous powertrain operations which require a transition through driveline lash, inclusive of, but not exclusive to, when the operator changes transmission gears (e.g., from neutral or park to drive or reverse), when the operator tips into or out of the throttle, or when the vehicle is operated on an inclined surface. However, if is desirable to look a preselected operations where the torque changes are significant enough such that estimated values are more accurate.

Figure 4:
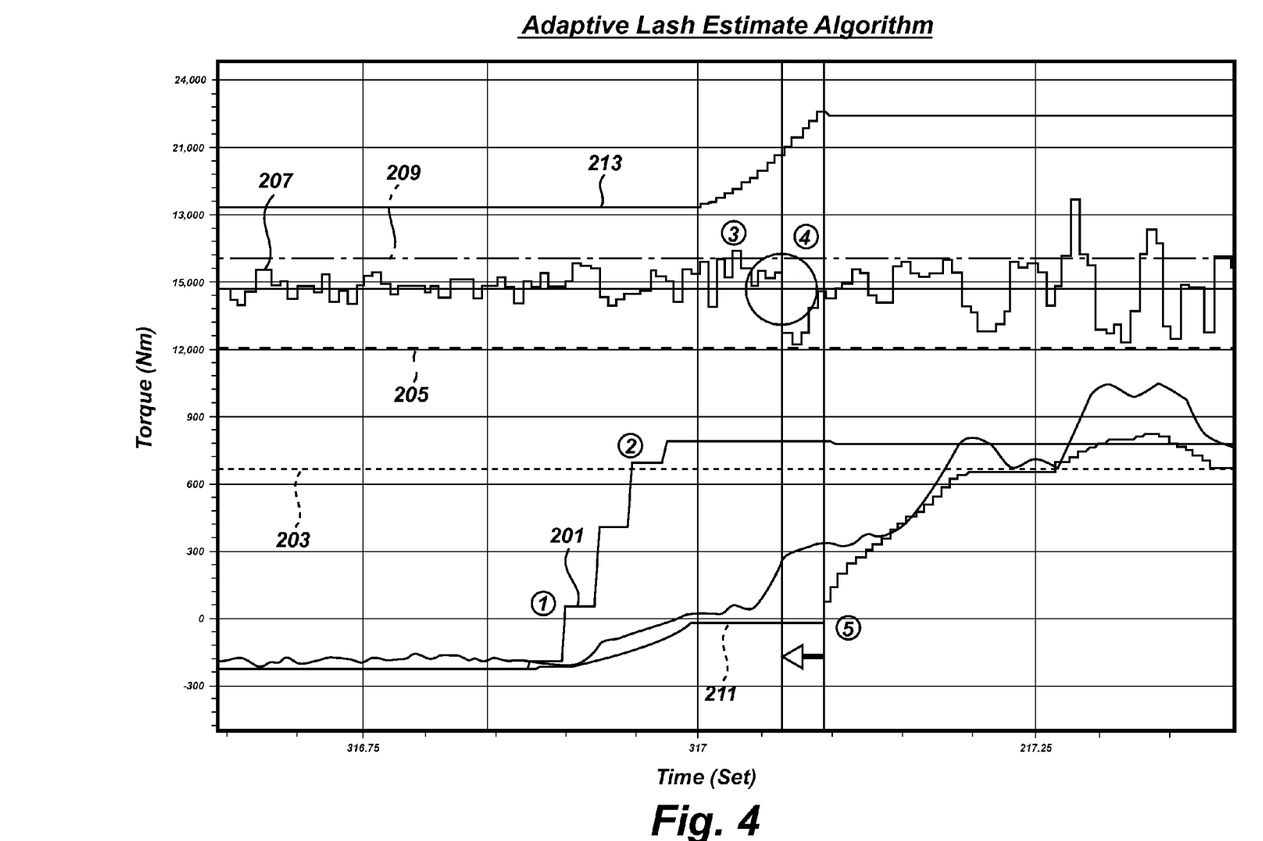
FIG. 4 is a graphical representation illustrating the relationship between driver commanded axle torque, transmission output acceleration, axle torque estimate, lash angle estimate, estimated lash state, detected lash take up, and lash angle correction.

In the exemplary embodiment of FIG. 3, the system monitors, in a preferably continuous manner, the unfiltered, unlimited driver commanded/desired axle torque. A graphical representation of the dynamic characteristics of driver commanded axle torque one might expect during normal vehicle operation is illustrated in FIG. 4, indicated at 201, for a better understanding of the present invention. In step 103, the method 100 then detects or senses if the driver commanded torque changes sign—i.e., switches from a positive value to a negative value, or vice versa, and then stays within a predetermined range. Specifically, if the driver commanded axle torque 201 changes sign, which can be seen at Event 1 in FIG. 4, and then contemporaneously therewith increases to a value that is greater than a minimum driver commanded torque threshold 203 (approximately 700 Newton-meters), and less than a maximum driver commanded torque threshold 205 (approximately 1200 Newton-meters) for a calibrated period of time (e.g., approximately 50 milliseconds), which can be seen at Event 2 in FIG. 4, it is a good indication the powertrain is transitioning through driveline lash. It should be readily recognized that the commanded torque range—i.e., minimum and maximum driver commanded torque thresholds, can be modified without departing from the scope of the present invention.

Once it is determined that the powertrain is transitioning through lash, a timer is started in step 105, and the HCP 5 will thereafter monitor the point in time at which driveline lash is taken up after tip-in/tip-out, and then compare that time with the estimated point of lash take up. Accordingly, in step 107, the HCP 5 will sense, detect or otherwise determine when the current driveline lash is taken up by the system. In the exemplary embodiment illustrated herein, the system processes the transmission output speed signal, $N_O$, to determine when lash is actually taken up (e.g., lash has been traversed and the gears are now in contact on the opposite side). The transmission output speed signal, $N_O$, is converted to output acceleration, which is illustrated herein for explanatory purposes at 207. Lash take up can be accurately inferred when the transmission output acceleration 207 exceeds a predetermined, minimum output acceleration threshold, indicated in FIG. 4 at 209 (see Event 3 in FIG. 4), and thereafter switches from a positive value to a negative value (seen at Event 4 in FIG. 4), or vice versa. The detected change in direction in the output acceleration indicates when the vehicle has finished crossing to the other side of lash. If lash has been taken up (i.e., Step 107=Yes), a counter is started in step 109 of FIG. 5. If lash has not been taken up, the HCP 5 will determine if the timer has expired (Step 111); if time has not expired, the method 100 returns to step 107; if, however, the timer has expired, the algorithm will abort and reset all timers and counters. Depending on the configuration of the transmission, other speeds can be used to detect lash take up. For example, in the system of FIG. 1, Motor B could be used to accomplish the same thing. As an additional alternative, an accelerometer may be used to detect lash take up, which would reduce the noise introduced by the differentiation of the speed signal, but would have added cost requirements.

Prior to, contemporaneous with, or after steps 107-111, the HCP 5 will sense, detect or otherwise determine when the estimated lash state changes from a neutral state to a positive or a negative state, in step 113. There are a variety of ways to identify when the estimated lash state changes from zero to the positive or negative side of lash. One manner of determining when the estimated lash state changes is by monitoring the transmission output speed, $N_O$, and the wheel speed, $N_{WHL}$ (reflected as output speed through the final drive ratio), and integrating the difference between the two to determine the current angle (i.e., position) from a predetermined starting angle based on whether the system was on the positive or negative side just before entering the neutral state. Once the angle has reached the nominal value plus the adaptive value on either the positive or negative side, then the estimated lash state has changed to either the positive state or negative state from the neutral state. Looking at FIG. 4, the dynamic behavior of the axle torque estimate, $T_{AXLE-EST}$, is generally characterized therein at 211. By observing the axle torque estimate 211, one can infer that the estimate has changed from zero to a positive value at Event 5, which can be seen in FIG. 4. The axle torque estimate 211 can be used to determine when the system enters lash—e.g., when the current axle torque plus the next axle torque as determined by the axle torque rate goes beyond some calibratable value, it can be inferred that the system entered the neutral lash state. When coming out of lash, the axle torque estimate changes from zero to some non-zero value as a result of leaving the neutral lash state.

The neutral state is indicated when there is substantially no torque being transmitted between the drive wheels and the driveline. If the estimated lash state has changed (i.e., Step 113=Yes), a lash state change counter is started in step 115 of FIG. 5. If the estimated lash state has not changed, the HCP 5 will determine if the timer (started in step 105) has expired in step 117. If the timer has not expired, the method 100 returns to step 113; if, however, the timer has expired, the algorithm will abort and reset.

As indicated in step 119 of FIG. 5, the method 100 effectively waits for both the lash to be taken up and the estimated lash state to change before proceeding to steps 121-127. If the allotted time for both events to occur lapses (i.e., the timer from step 105 expires) before steps 107 and 113 are complete, the control algorithm 100 will "timeout"—i.e., abort and reset for the next sequence of events.

Upon completion of steps 107-119, the system must verify that the sign change in transmission output acceleration can be validated against the direction of change in estimated lash state, in step 121. By default, if the timer expires, these two events cannot be verified; the method 100 will thus reset all timers and counters, step 123, and thereafter terminate. Put another way, the switch in transmission output acceleration is not validated against the change in estimated lash state if the transmission output acceleration does not switch signs or the estimated lash state does not change states within a predetermined period of time. On the other hand, to say that the events have been validated, the output acceleration changes sign in the opposite direction to which the lash state changes. For example, the switch in transmission output acceleration is validated against the change in estimated lash state when either the transmission output acceleration switches to a negative value contemporaneously with the estimated lash state changing to a positive state, or the transmission output acceleration switches to a positive value contemporaneously with the estimated lash state changing to a negative state. To better characterize the output acceleration due to its noisy nature, it is recommended to also check that the output acceleration has some calibratable peak value after changing sign.

The control algorithm 100 of FIG. 5 looks for certain characteristics in the time derivative of the signals, windows the data based on vehicle operating conditions to ensure that the characteristics faithfully apply, and updates the adaptive lash estimate if necessary. If step 121 provides a positive response, the method determines if there is a time difference between when the driveline lash is taken up and when the estimated lash state changes—i.e., flag any difference between the two counters set in steps 109 and 115. If the times are different (i.e., delta T is not equal to zero), it is because the estimated total driveline lash value is incorrect. Responsively, the estimated total driveline lash value is then incremented in the appropriate direction to reduce the difference between the estimated time and the actual time. By way of example, the change in estimated lash state represented in our exemplary system of FIG. 4 at Event 5 does not occur until after the total lash is taken up, represented at Event 4. One manner of updating or recalculating the lash estimate includes calculating a lash angle adapt value, which involves applying an offset (e.g., −4) and a gain (e.g., 0.01) to the time difference. The total lash estimate is then calculated, for example, by adding the lash angle adapt value, which is negative when the lash angle estimate 213 is too large (as seen in FIG. 5) or positive when the lash angle estimate 213 is too small, to a preset nominal angle. This algorithm is preferably passive, continuously and systematically generating updated information under normal driving conditions.

While the best modes for carrying out the present invention have been described in detail, those familiar with the art to which this invention pertains will recognize various alternative designs and embodiments for practicing the invention within the scope of the appended claims.

The invention claimed is:

1. A method for determining driveline lash in a vehicle powertrain having a transmission, the method comprising:
    determining if the powertrain is transitioning through driveline lash;
    determining when a current driveline lash is taken up if the powertrain is transitioning through driveline lash;
    determining when an estimated lash state changes from a neutral state to one of a positive and a negative state; and
    calculating a total lash estimate when said current driveline lash is taken up and the estimated lash state changes from a neutral state to one of a positive and a negative state.

2. The method of claim 1, further comprising:
    determining a time difference between when said current driveline lash is taken up and when said estimated lash state changes from a neutral state to one of a positive and a negative state;
    wherein said total lash estimate is calculated in response to said time difference not being equal to zero.

3. The method of claim 2, wherein said calculating said total lash estimate includes calculating a lash angle adapt value, calculating said lash angle adapt value including applying an offset and a gain to said time difference.

4. The method of claim 3, wherein said calculating said total lash estimate includes adding said lash angle adapt value to a preset nominal angle.

5. The method of claim 1, wherein determining if the powertrain is transitioning through driveline lash includes detecting if a driver commanded torque switches from one of a positive and a negative value to the other of the positive and negative value, and if said driver commanded torque is between a minimum driver commanded torque threshold and a maximum driver commanded torque threshold.

6. The method of claim 1, wherein said determining when said estimated lash state changes from a neutral state to one of a positive and a negative state includes monitoring a transmission output speed and a wheel speed and integrating a difference between said transmission output speed and wheel speed to determine a current angle.

7. The method of claim 6, wherein said estimated lash state changes from a neutral state to one of a positive and a negative state when said current angle has reached a nominal value plus an adaptive value.

8. The method of claim 1, further comprising:
    verifying a predetermined array of necessary signals prior to determining if the powertrain is transitioning through driveline lash.

9. The method of claim 8, wherein verifying said predetermined array of necessary signals includes detecting if all validity signals are valid and all fault active signal are false.

10. The method of claim 1, wherein said determining when said current driveline lash is taken up includes determining if a transmission output acceleration exceeds a minimum output acceleration threshold, and if said transmission output acceleration switches from one of a positive and a negative value to the other of the positive and negative value.

11. The method of claim 10, further comprising:
    determining if the switch in transmission output acceleration can be validated against the change in estimated lash state.

12. The method of claim 10, wherein the switch in transmission output acceleration is validated against the change in estimated lash state when at least one of said transmission output acceleration switches to a negative value when said estimated lash state changes to the positive state, and said transmission output acceleration switches to a positive value when said estimated lash state changes to a negative state.

13. The method of claim 10, wherein the switch in transmission output acceleration is not validated against the change in estimated lash state if said transmission output acceleration does not switch and said estimated lash state does not change within a predetermined period of time.

14. A method for estimating driveline lash in a hybrid vehicle powertrain having at least one torque generative device in operative communication with a power transmission, the method comprising:
    monitoring a driver commanded torque sent to the vehicle powertrain;
    determining if said driver commanded torque switches from one of a positive and a negative value to the other of the positive and negative value;
    determining if said driver commanded torque is greater than a minimum driver commanded torque threshold and less than a maximum driver commanded torque threshold for a calibrated time if said driver commanded torque switches;
    determining if a transmission output acceleration exceeds a minimum output acceleration threshold;
    determining when said transmission output acceleration switches from one of a positive and a negative value to the other of the positive and negative value if said transmission output acceleration exceeds a minimum output acceleration threshold;
    determining when an estimated lash state changes from a neutral state to one of a positive and a negative state;
    determining a time difference between when said transmission output acceleration switches and when said estimated lash state changes from a neutral state to one of a positive and a negative state;
    updating an adaptive lash estimate if said time difference is not equal to zero.

15. The method of claim 14, wherein said updating said adaptive lash estimate includes calculating a lash angle adapt value, and adding said lash angle adapt value to a preset nominal angle, wherein calculating said lash angle adapt value includes applying an offset and gain to said time difference.

16. The method of claim 14, wherein said determining when said estimated lash state changes from a neutral state to one of a positive and a negative state includes monitoring a transmission output speed and a wheel speed and integrating a difference between said transmission output speed and wheel speed to determine a current angle, said estimated lash state changing from a neutral state to one of a positive and a negative state when said current angle has reached a nominal value plus an adaptive value.

17. A control apparatus for estimating driveline lash in a vehicle powertrain having at least one torque generative device in driving communication with a power transmission, the control apparatus comprising:

a controller having a storage medium and a programmable memory, said controller being in operative communication with the powertrain and configured to control operation of the same;

wherein said controller is programmed and configured to determine if the powertrain is transitioning through driveline lash, and respond to said powertrain transitioning through driveline lash by determining when a current driveline lash is taken up and when an estimated lash state changes from a neutral state to one of a positive and a negative state;

wherein said controller is programmed and configured to determine if there is a time difference between when said current driveline lash is taken up and when said estimated lash state changes from a neutral state to one of a positive and a negative state, and update an adaptive lash estimate if there is a time difference.

* * * * *